(12) United States Patent
Jang et al.

(10) Patent No.: US 8,331,455 B2
(45) Date of Patent: Dec. 11, 2012

(54) DEVICE AND METHOD FOR ENCODING/DECODING VIDEO DATA

(75) Inventors: Euee-S Jang, Seoul (KR); Sun-Young Lee, Seoul (KR); Chung-Ku Lee, Incheon (KR)

(73) Assignee: Humax Co., Ltd., Seongnam-Si (KR)

( * ) Notice: Subject to any disclaimer, the term of this patent is extended or adjusted under 35 U.S.C. 154(b) by 1187 days.

(21) Appl. No.: 12/160,763

(22) PCT Filed: Dec. 28, 2006

(86) PCT No.: PCT/KR2006/005850
§ 371 (c)(1),
(2), (4) Date: Jul. 11, 2008

(87) PCT Pub. No.: WO2007/081106
PCT Pub. Date: Jul. 19, 2007

(65) Prior Publication Data
US 2009/0003456 A1    Jan. 1, 2009

(30) Foreign Application Priority Data

Jan. 12, 2006  (KR) .................... 10-2006-0003679

(51) Int. Cl.
*H04N 1/64* (2006.01)
(52) U.S. Cl. ............................................. 375/240.24
(58) Field of Classification Search . 375/240.01–240.29
See application file for complete search history.

(56) References Cited

U.S. PATENT DOCUMENTS

| | | | | |
|---|---|---|---|---|
| 5,614,952 A * | 3/1997 | Boyce et al. | ............. | 375/240.01 |
| 6,263,019 B1 * | 7/2001 | Ryan | ................. | 375/240.02 |
| 6,532,269 B2 * | 3/2003 | Yamada et al. | ............. | 375/265 |
| 6,965,328 B2 * | 11/2005 | Ji | ..................... | 341/50 |
| 7,173,970 B2 * | 2/2007 | Boyce et al. | ............. | 375/240.15 |
| 7,830,964 B2 * | 11/2010 | Winger et al. | ............ | 375/240.23 |
| 2002/0051082 A1 | 5/2002 | Yamada et al. | | |
| 2009/0003456 A1 * | 1/2009 | Jang et al. | ................ | 375/240.24 |

FOREIGN PATENT DOCUMENTS

| | | |
|---|---|---|
| JP | 10-51778 A | 2/1998 |
| JP | 2001-337685 A | 12/2001 |
| JP | 2004-104835 A | 4/2004 |
| KR | 10-2006-0038189 A | 5/2006 |
| WO | 98/06221 A1 | 2/1998 |
| WO | WO-03/034743 A1 | 4/2003 |

\* cited by examiner

*Primary Examiner* — Ricky Ngo
*Assistant Examiner* — Ben H Liu
(74) *Attorney, Agent, or Firm* — Birch, Stewart, Kolasch & Birch, LLP

(57) ABSTRACT

A video data encoding/decoding device and method are disclosed. The decoding device includes a syntax parsing unit, storing a plurality of element information, generated by syntax parsing of a bit stream using description information, in an element information storing unit; a connection controlling unit, successively selecting a plurality of functional units by using the description information, and selectively inputting element information predetermined for the selected functional unit of the plurality of element information stored in the element information storing unit; and a processing unit, comprising at least a functional unit performing a process predetermined by using the element information inputted by the connection controlling unit, and outputting corresponding result data. Accordingly, the present invention can decode a bit stream, decoded by various format in accordance with various standards, by using an identical information recognizing method.

19 Claims, 8 Drawing Sheets

DEVICE AND METHOD FOR ENCODING/DECODING VIDEO DATA

TECHNICAL FIELD

The present invention is related to a video data encoding/decoding device and method, more specifically to a video data encoding/decoding device and method that can be universally used for various encoding/decoding standards.

BACKGROUND ART

Typically, video data is converted into bit-stream data by an encoder. At this time, the bit-stream is stored depending on a coding type that satisfies the constraint condition of the encoder.

MPEG, which is the constraint condition of the encoder, requests syntax and semantics.

The syntax, which refers to the structure, format, or length of data, shows the sequence of expressing the data. In other words, the syntax is to meet a rule for encoding/decoding and defines the sequence, length and format of each data in the elements of the bit stream.

The semantics refers to the meaning of each bit forming data. In other words, the semantics shows the meaning of each element in the bit stream.

Accordingly, various types of bit streams can be generated depending on the encoding condition or the applied standard (or codec) of the encoder. Typically, each standard (e.g. MPEG-1, MPEG-2, MPEG-4, and MPEG-4 AVC) has different bit stream syntax.

Therefore, it can be said that the bit stream encoded according to each standard or encoding condition has different types (i.e. syntax and semantics). A decoder corresponding to a pertinent encoder must be used for the deciding of the bit stream.

As described above, the conventional bit stream decoder has a restriction that must satisfy the constraint condition of the encoder. This restriction makes it difficult to realize an integration decoder corresponding to a plurality of standards.

DISCLOSURE

Technical Problem

Accordingly, the present invention, which is designed to solve the aforementioned problems, provides a video data encoding/decoding device and method that can decode a bit steam encoded by various types (syntax and semantics) in accordance with each standard (e.g. MPEG-1, MPEG-2, MPEG-4, MPEG-4 AVC) by using the same information recognizing method.

Also, the present invention provides a video data encoding/decoding device and method that can parse a bit stream compressed by various methods by using the same information analyzing method and organically control each functional unit for decoding by using the parsed data.

Also, the present invention provides a video data encoding/decoding device and method that can commonly apply a syntax analyzing method for decoding various types of bit streams.

Also, the present invention provides a video data encoding/decoding device and method that can easily decode a bit stream when a syntax element is changed or added.

Moreover, the present invention provides a video data encoding/decoding device and method that can share elements used for the bit stream decoding of the element information (i.e. a result from syntax parsing) of analyzed syntax.

Moreover, the present invention provides a video data encoding/decoding device and method that can use the element information of analyzed syntax for analyzing the syntax element of a following bit stream.

In addition, the present invention provides a video data encoding/decoding device and method that can internationally standardize concept and structure of codec integration for bit stream decoding.

Other problems that the present invention solves will become more apparent through the following description.

Technical Solution

To solve the above problems, an aspect of the present invention features an encoder/a decoder and/or an integrated codec apparatus that can be universally used for various standards.

According to an embodiment of the present invention, there is providing the decoding device that includes a syntax parsing unit, storing a plurality of element information, generated by syntax parsing of a bit stream using description information, in an element information storing unit, the description information and the bit stream being provided from a encoder; a connection controlling unit, successively selecting a plurality of functional units by using the description information, and selectively inputting element information predetermined for the selected functional unit of the plurality of element information stored in the element information storing unit; and a processing unit, comprising at least a functional unit performing a process predetermined by using the element information inputted by the connection controlling unit, and outputting corresponding result data.

The decoding device can further include a universal bit stream analyzing unit, separating a universal bit stream into the bit stream and the description information, inputting the bit stream into the syntax parsing unit, and storing the description information in a description information storing unit if the bit stream and the description information are inputted as the universal bit stream.

The description information can be inputted as independent data or a bit stream.

The result data of a prior-activated functional unit can be inputted to a subsequent—activated functional unit in a plurality of functional units successively selected by the connection controlling unit The syntax parsing unit can convert the bit stream to a successive macro block of a predetermined size and inputs the macro block into the processing unit.

The description information can consist of a binary code.

The description information can include a syntax element table (SET), referring to a process generating information related to bit stream syntax and element information corresponding to the bit stream syntax; a syntax rule table (S-RT), referring to a connection rule between the bit stream syntax; a control signal and text information table (CSCIT), referring to the details of the element information; a functional unit list (FL), referring to a list of the functional units; a functional unit-rule table (F-RT), successively selecting the functional units; and a function unit-CSCIT (FU-CSCIT), referring to element information to be inputted into the selected functional unit.

In this case, the syntax parsing unit can select bit stream syntax to be processed by using the S-RT, generates the element information by using the process written in the SET, and stores the generated element information in the element information storing unit to correspond to the CSCIT.

Also, the connection controlling unit selects any one functional unit by using the F-RT, recognizes the property of the functional unit by using the FL, extracts element information, to be inputted into the selected functional unit, from the element information storing unit by using FU-CSCIT and the CSCIT, and inputs the extracted element information into the selected functional unit.

According to another embodiment of the present invention, there is an encoding device that includes an encoding unit, converting inputted video data into a bit stream according to predetermined encoding method by successively using a plurality of functional units; and a description information generating unit, generating description information in accordance with syntax information of the bit stream and connection relationship of the functional units, whereas the bit stream and the description information are provided together to a decoder.

The bit stream and the description information can be generated as a universal bit stream and provided to the decoder.

The description information can be provided to the decoder as independent data or a bit stream.

The description information can include a syntax element table (SET), referring to a process generating information related to bit stream syntax and element information corresponding to the bit stream syntax; a syntax rule table (S-RT), referring to a connection rule between the bit stream syntax; a control signal and text information table (CSCIT), referring to the details of the element information; a functional unit list (FL), referring to a list of the functional units; a functional unit-rule table (F-RT), successively selecting the functional units; and a function unit-CSCIT (FU-CSCIT), referring to element information to be inputted into the selected functional unit.

To solve the above problems, another aspect of the present invention features a decoding method/an encoding method that can be universally used for various standards and/or a recorded medium recording a program for executing the method thereof.

According to an embodiment of the present invention, there is a decoding method that includes receiving a bit stream and description information from an encoding device; storing a plurality of element information, generated by syntax parsing of the bit stream using the description information, in an element information storing unit; converting the bit stream to a successive macro block of a predetermined size and outputting the macro block; selecting a functional unit by using the description information, and selectively inputting element information predetermined for the selected functional unit of the plurality of element information stored in the element information storing unit; and the selected functional unit performing a process predetermined by using the inputted element information and outputting corresponding result data, whereas the step of selecting the functional unit and selectively inputting element information predetermined for the selected functional unit and the step that the selected functional unit performs the process are repeated until the result data is video data corresponding to the macro block The description information can include a syntax element table (SET), referring to a process generating information related to bit stream syntax and element information corresponding to the bit stream syntax; a syntax rule table (S-RT), referring to a connection rule between the bit stream syntax; a control signal and text information table (CSCIT), referring to the details of the element information; a functional unit list (FL), referring to a list of the functional units; a functional unit-rule table (F-RT), successively selecting the functional units; and a function unit-CSCIT (FU-CSCIT), referring to element information to be inputted into the selected functional unit.

In this case, the step of storing the plurality of element information in the element information storing unit can include selecting bit stream syntax to be processed by using the S-RT; generating the element information by using the process written in the SET; and storing the generated element information in the element information storing unit to correspond to the CSCIT. Here, these above three steps can be repeated until element information corresponding to all bit stream syntax is generated and stored.

The step of the step of selecting the functional unit and selectively inputting element information can include selecting any one functional unit by using the F-RT; extracting element information, to be inputted into the selected functional unit, from the element information storing unit by using FU-CSCIT and the CSCIT, to correspond to the property of the functional unit recognized by using the FL; and inputting the extracted element information into the selected functional unit.

The step of separating a universal bit stream into the bit stream and the description information, inputting the bit stream into the syntax parsing unit, and storing the description information in a description information storing unit can precedently be performed if the bit stream and the description information are inputted as a universal bit stream.

The description information is inputted as independent data or a bit stream.

The result data of a prior-activated functional unit can be inputted to a subsequent-functional unit in a plurality of functional units successively selected.

The description information can consist of a binary code.

MODE FOR INVENTION

Figure 1:
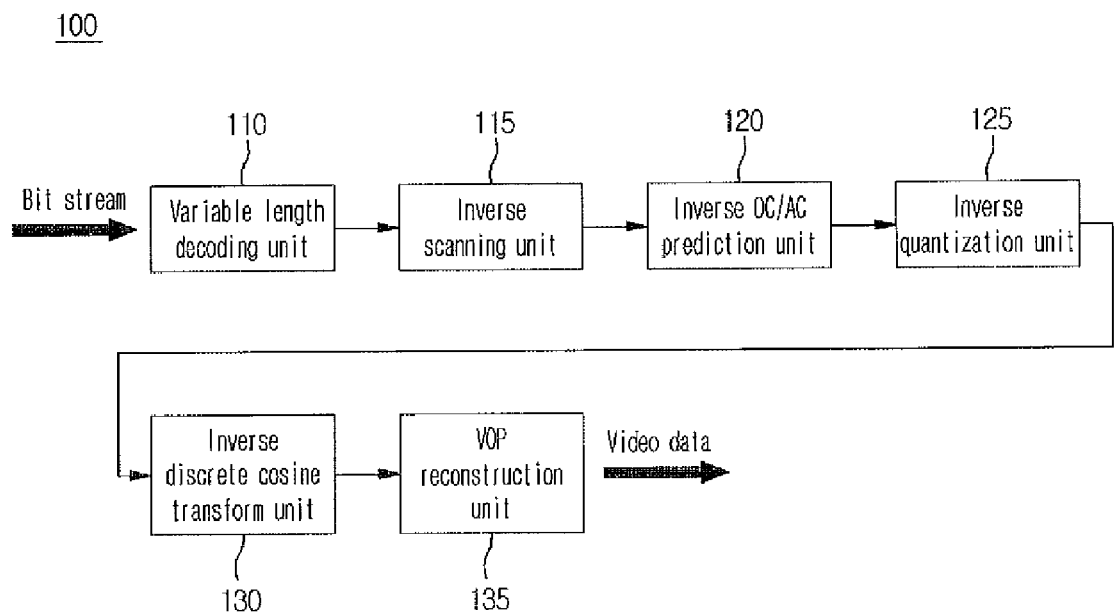
FIG. 1 is a simplified block diagram illustrating the structure of a typical decoder.

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

Figure 2:
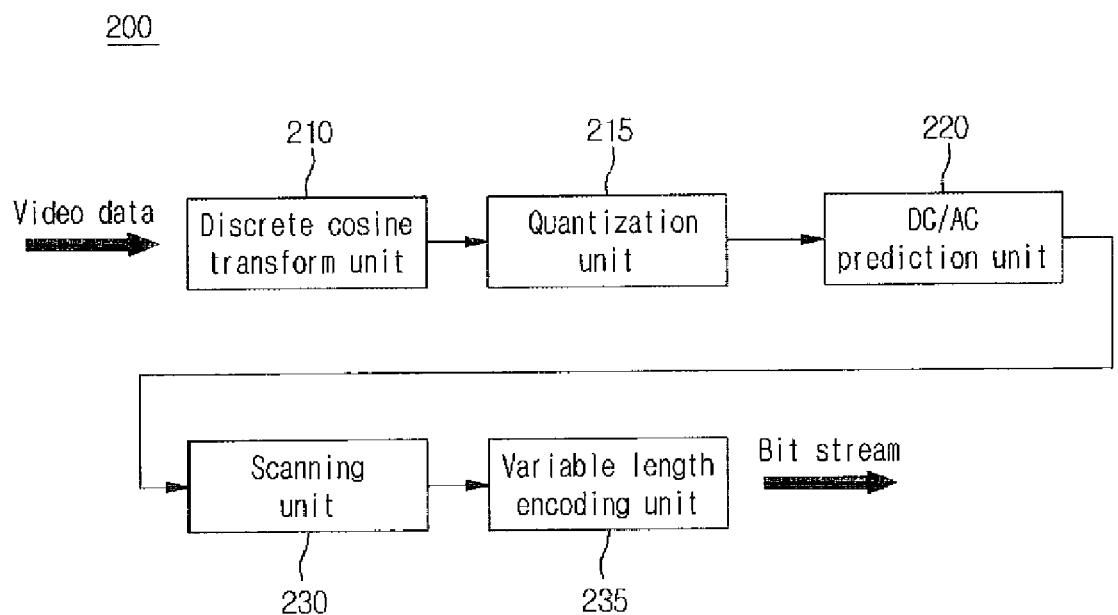
FIG. 2 is a simplified block diagram illustrating the structure of a typical encoder.

FIG. 1 is a simplified block diagram illustrating the structure of a typical decoder, and FIG. 2 is a simplified block diagram illustrating the structure of the typical encoder.

As illustrated in FIG. 1, an MPEG-4 decoder 100 typically includes a variable length decoding unit 110, an inverse scanning unit 115, an inverse DC/AC prediction unit 120, an inverse quantization unit 125, an inverse discrete cosine transform unit 130 and a VOP reconstruction unit 135.

It shall be evident that the decoder 100 can have a structure changed depending on an applying standard and some elements can be replaced with other elements.

If a transferred bit stream is syntax-parsed and corresponding header information and a corresponding image data are extracted, the variable length decoding unit 110 forms a quantized discrete cosine transform (DCT) coefficient by using predetermined Huffman table, the inverse scanning unit 115 generates data having the same sequence as pertinent video data by performing inverse scanning. In other words, the inverse scanning unit 115 outputs a value in inverse order of scanning by various methods. In the encoding, after performing the quantization, a scanning direction can be defined depending on the distribution of frequency range. Typically, a zig-zag scanning method can be used. However, various scanning methods per codec can be used.

Syntax parsing can be integratedly performed in the variable length decoding unit 110 or in an element for processing the bit stream prior to the variable length decoding unit 110. In this case, since the same standard is applied to the corresponding encoder and decoder, the syntax parsing is processed by a predetermined setting only, to correspond to the pertinent standard.

The inverse DC/AC prediction unit 120 determines the direction of a reference block for prediction by using the size of the DCT coefficient at a frequency range.

The inverse quantization unit 125 performs the inverse quantization of inverse-scanned data. In other words, the inverse quantization unit 125 returns DC and AC coefficients by using a quantization parameter (OP) designed in an encoding process.

The inverse discrete cosine transform unit 130 calculates an actual video data pixel value to generate a video object plane (VOP) by performing inverse discrete cosine transform.

The VOP reconstruction unit 135 decodes a video signal by using the VOP generated by the inverse discrete cosine transform unit 130 and outputs the decoded signal.

As illustrated in FIG. 2, an MPEG-4 encoder 200 typically includes a discrete cosine transform unit 210, a quantization unit 215, a DC/AC prediction unit 220, a scanning unit 230 and a variable length encoding unit 235.

Each element included in the encoder 200 performs the inverse functions of the corresponding elements of the encoder 100. This is well-known to those of ordinary skill in the art. Briefly describing, the encoder 200 converts a video signal (i.e. a digital video pixel value) to a frequency value through the DCT and the quantization and performs the encoding. Then, the encoder 200 performs variable length encoding to differentiate bit length according to the frequency number of information and outputs compressed bit stream format.

Figure 3:
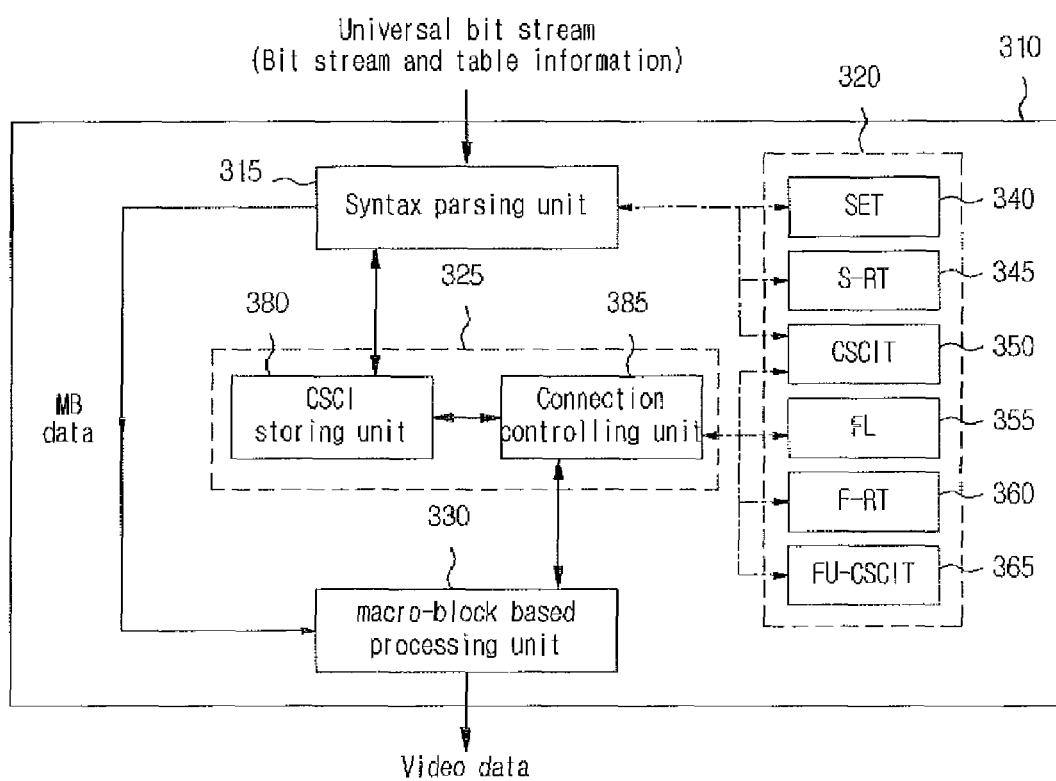
FIG. 3 is a simplified block diagram illustrating the structure of a decoder in accordance with an embodiment of the present invention.
Figure 4:
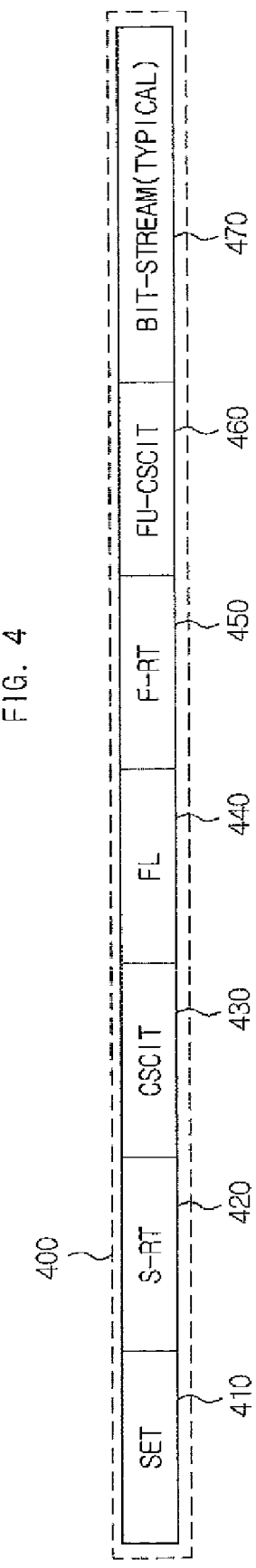
FIG. 4 is a simplified block diagram illustrating the structure of a universal bit-stream in accordance with an embodiment of the present invention.
Figure 5:
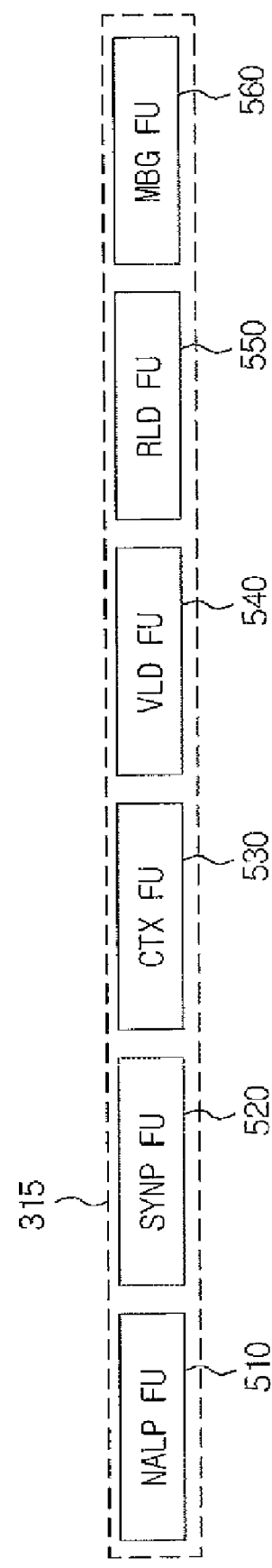
FIG. 5 is a simplified block diagram illustrating the structure of a syntax parsing group in accordance with an embodiment of the present invention.
Figure 6:
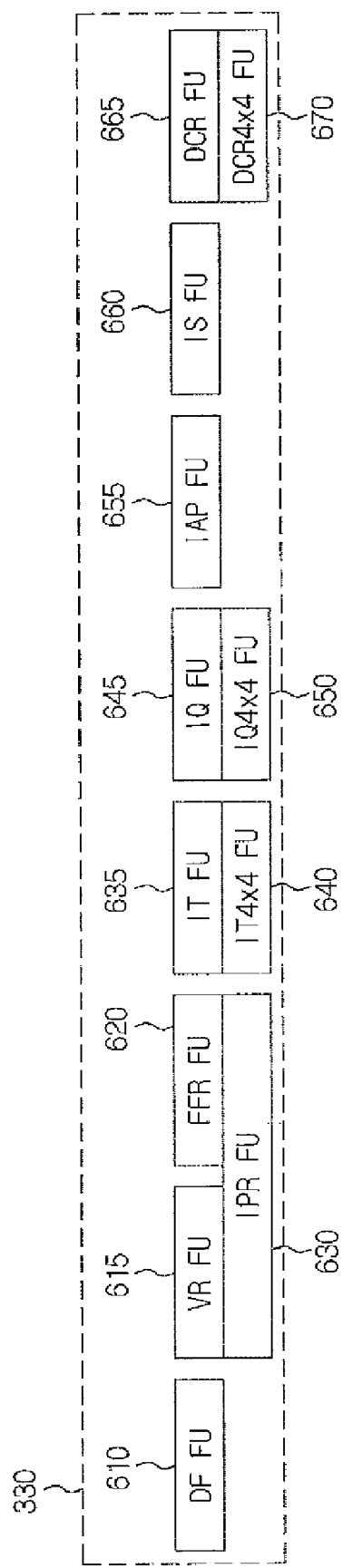
FIG. 6 is a simplified block diagram illustrating the structure of a macro-block based processing group in accordance with an embodiment of the present invention.
Figure 7:
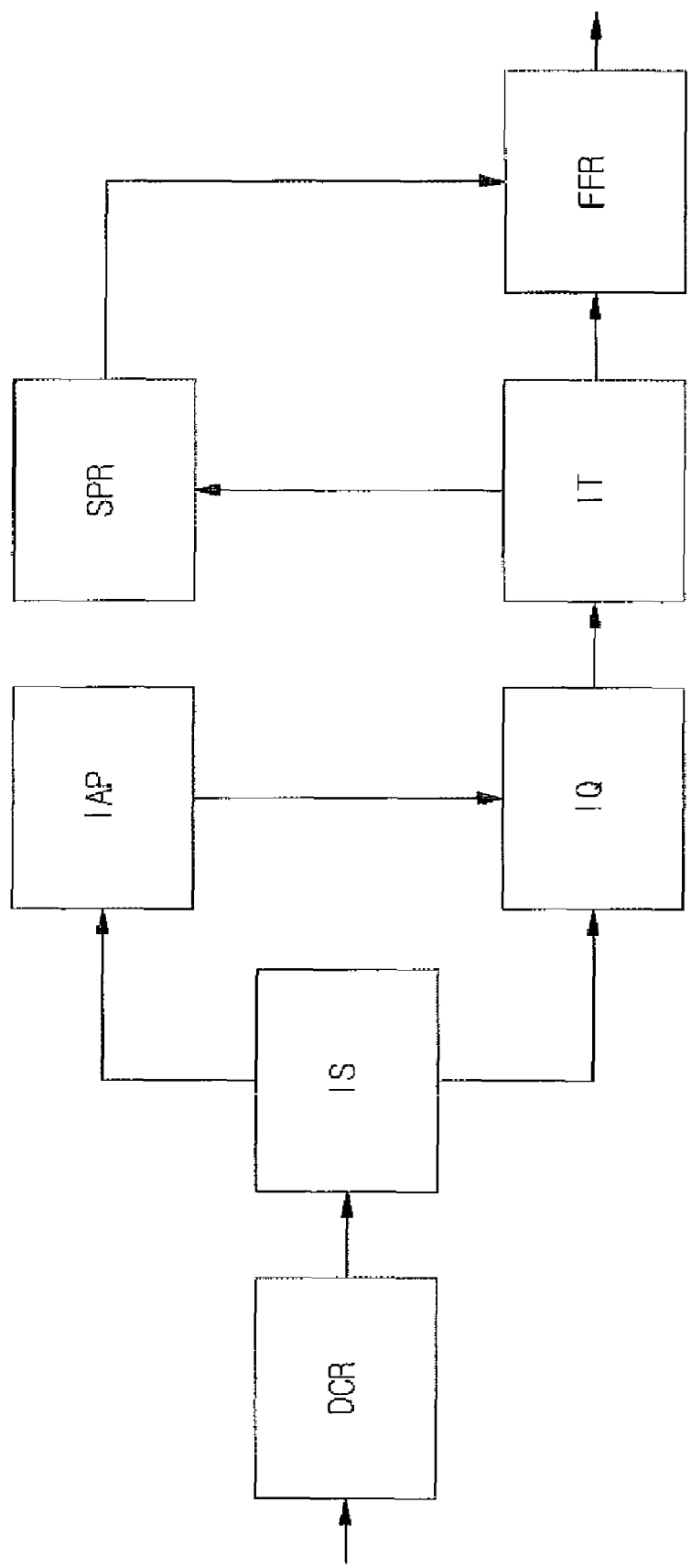
FIG. 7 is a simplified block diagram illustrating the connection structure of functional units in accordance with an embodiment of the present invention.

FIG. 3 is a simplified block diagram illustrating the structure of a decoder in accordance with an embodiment of the present invention, and FIG. 4 is a simplified block diagram illustrating the structure of a universal bit-stream in accordance with the embodiment of the present invention. FIG. 5 is a simplified block diagram illustrating the structure of a syntax parsing group in accordance with the embodiment of the present invention. FIG. 6 is a simplified block diagram illustrating the structure of a macro-block based processing group in accordance with the embodiment of the present invention. FIG. 7 is a simplified block diagram illustrating the connection structure of functional units in accordance with the embodiment of the present invention.

As illustrated FIG. 3, the decoder 310 of the present invention has a different function from the conventional decoder (refer to FIG. 1).

In other words, the decoder 310 in accordance with the embodiment of the present invention includes a syntax parsing group 315, a table storing unit 320, a decoding controlling unit 325 and a macro-block based processing group 330.

The syntax parsing group 315 analyzes an inputted universal bit stream and stores element information as the syntax parsed result in a CSCI storing unit 380. A typical bit stream (i.e. an element of the universal bit stream and hereinafter referred to as 'conventional bit stream') is syntax-parsed and undergoes entropy deciding for a header and image data. Then, the pertinent video data having a predetermined macro block size is outputted to the macro-block based processing group 330.

It shall be evident that the syntax parsing group 315 can store the video data having the macro block size in the CSCI storing unit 380 and a connection controlling unit 385 can input the stored video data having the macro block size into a selected functional unit. However, the below description mainly relates to the case that the video data having the macro block size, outputted by the syntax parsing group 315, is directly inputted into the macro-block based processing group 330.

For example, the element information can be control signal/context information (CSCI). The element information, which is parsed by the syntax parsing unit 315 and stored in the CSCI storing unit 380, can be the parsed result value of a pertinent step, and at the same time, can be an input value for determining the syntax of the following bit stream.

A universal bit stream 400, as illustrated in FIG. 4, further includes decoding description information in addition to a typical bit stream.

The decoding description information includes bit stream structure information and information related to a bit stream encoding method (or function), which are to parse a first bit stream, encoded by various coding methods, and/or a second bit stream, encoded by a function that is selected by a user among various functions, by using a common analyzing method. It is evident and easily understood by those of ordinary skill in the art that the decoding description information can be included in the universal bit stream and provided to the decoder 310 or can be provided to the decoder 310 by additional bit stream format or data. The decoding description information can be described by a textual description method or a binary description method.

The decoding description information can include a syntax element table (SET) 410, a syntax-rule table (S-RT) 420, a control signal and context information table (CSCIT) 430, a functional unit list (FL) 440, a functional unit rule table (F-RT) 450 and a functional unit CSCIT (FU-CSCIT) 460. It is evident that each table in the decoding description information can be arranged in various orders.

Here, the SET 410, S-RT 420 and CSCIT 430 can be referred to as "the decoding description information for the parsing of the conventional bit stream (as necessary, first description information)." Also, the CSCIT 430, FL 440 and F-RT 450 can be referred to as "the decoding description information for setting the flexible connection of each functional unit included in the syntax parsing group 315 and/or the macro-block based processing group 330. (as necessary, second description information)." The Fu-CSCIT 460 can be referred to as "the decoding description information for mapping each functional unit included in the macro-block based processing group 330 to the element information stored in the CSCI storing unit 380. In this case, the element information can function like a variable for controlling each functional unit included in the macro-block based processing group 330. The type and function of the each decoding description information will be described below.

The syntax parsing group 315 performs the parsing of a conventional bit stream 470 and stores pertinent element information (e.g. CSCI) as the result in the CSCI information. The syntax parsing group 315 can be realized as a software program (including the combination of program codes).

Below is described the function of the syntax parsing group 315 per functional unit for the convenience of understanding.

The syntax parsing group 315, as illustrated in FIG. 5, can include a network abstraction layer parsing functional unit (NALP FU) 510, a syntax parsing functional unit (SYNP FU) 520, a context determination functional unit (CTX FU) 530, a variable length decoding functional unit (VLD FU) 540, a run length decoding functional unit (RLD FU) 550 and a macro block generator functional unit (MBG FU) 560. Of course, it shall be evident that the syntax parsing group 315 can include all functional units for syntax parsing regardless of the applied standard, a functional requested for a technology development process can be newly added, a previous functional unit can be amended and an unnecessary functional unit can be deleted. It is also evident that each functional unit included in the syntax parsing unit 315 can be integrated as one functional unit in case that they are independently not provided at each standard and can be identically processed regardless of the standards. Since the functions of each of the functional units are well-known to those of ordinary skill in the art, they will be described in detail.

The NALP FU 510 is a functional unit parsing the network abstraction layer of MPEG-4 AVC, and the SYNP FU 520 is a functional unit parsing the syntax of the bit stream. The SYNP FU 520 can be included in the VLD FU 540.

The CTX FU 530 is a functional unit determining the VLC table of MPEG-4 AVC, and the VLD FU 540 is a functional unit performing an entropy decoding.

The RLD FU 550 is a functional unit performing the entropy decoding of AC values, and the MBG FU is a functional unit generating macro block data by coupling DC values with AC values. The functions corresponding to all or some of functional units in the aforementioned syntax parsing unit 315 can be included in the VLD FU 540 depending on a system realizing method.

As described above, the syntax parsing unit 315 can be realized as one software program or a plurality of software programs (e.g. the VLD FU 540 is realized as an independent software program).

Also, the syntax parsing unit 315 can further include an element (e.g. software program) converting binary data in the universal bit stream to a table that the syntax parsing unit 315 can analyze. Of course, in case that the syntax parsing unit 315 does not include the pertinent element, the element must be included prior to the syntax parsing unit 315. The table converted by the element (i.e. decoding description information) is stored in the table storing unit 320.

Hereinafter, the process that the syntax parsing unit 315 extracts or generates element information by using the first description information (i.e. the SET 410, S-RT 420 and CSCIT 430) and stores the element information in the CSCI storing unit 380 will be described.

First, the SET 410 is a table that consists of information related to the syntax of the inputted conventional bit stream.

The SET 410 includes index of each syntax, element name, input data, output data and process. Here, the index is an identifier S identifying each syntax used for the S-RT 420. The element name can be called after the name of syntax according to the meaning or function of the syntax. The input data refers to nominal bit length of data inputted at a time in the bit stream. The output data represents a list of the CSCIT 430 referred to when storing acquired data, as the element information (i.e. CSCI). The process describes what processing operation is undergone after receiving each syntax of bit stream as the output data to generate the element information.

Below is an example of the SET 410

TABLE 1

| Index | Element Name | Input | Output | Process by SET-PROC |
|---|---|---|---|---|
| M | Marker Bit | 1 bit | 0 | READ 1 > C0; |
| S0 | Visual object sequence start code | 32 bit | 0 | READ 32 B;(C0=($IBS==HEX:B0)); |
| S1 | Profile and level indication | 8 bit | 2 | READ 8 > C2; |
| S2 | Visual object sequence end code | 32 bit | 0 | READ 32 B; (C0=($IBS==HEX:1B1)); |
| S3 | Is user data or not | 32 bit | 1 | SEEK 32 B; (C1=($IBS==HEX:1B2)); |
| S4 | User data start code | 32 bit | 0 | READ 32 B;(C0=($IBS==HEX:1B2); |
| S5 | User data | 8 bit (Array) | 3 | SEEK 24;WHILE ($IBS != 1) {READ 8;(C3 @ $IBS; SEEK 24;} |
| S6 | Visual object start code | 32 bit | 0 | READ 32 B;(C0=($IBS==HEX:1B5));DEFAULT C4, C5; |
| ... | ... | ... | ... | ... |

As an example, the SET 410 can represent key minimum data of the table by using the similar script languish 'SET {(process), ( . . . )}'. The actual example is below.

```
SET {
("READ 32 B; (C0=($IBS==HEX:B0));") ,
("READ 8 > C2;") ,
("READ 32 B; (C0=($IBS==HEX:1B1));")
...
}
```

As another example, the SET 410 can be represented in a binary code format through bit conversion as follows. In this case, an identifying code referring to SET is represented as '00' of a 2 bit indicator. An end part of the table is represented by a end of table (EOT). It is assumed that variable length text data, bit-compiled for each syntax, is arranged.

```
00
000100000...
01010000000010...
00010...
...
EOT
```

Even though the SET 410 can be represented in various formats as described above, each format represents the same meaning.

Then, the S-RT 420 refers to connection rule between each syntax in the bit stream. In other words, the S-RT has information indicating to call each syntax and to move to next syntax. The syntax parsing unit 315 uses the R-ST 420 to read the pertinent bit stream or to define the sequence of storing and/or renewing the element information in the CSCI storing unit 380.

As illustrated in table 2 below, the S-RT 420 includes index t, index S of syntax, input data C, number of branch and branch information.

The index R identifies each connection rule. Since the index S of syntax designates syntax that a particular connection index processes, the syntax parsing unit 315 accesses the SET 410 and performs the designated process of the pertinent syntax.

The input data refers to a list of element information to be used for condition determination for controlling the connection of the pertinent connection index.

The number of branch refers to the total numbers of the branch route of a corresponding connection index as the number of cases capable of being connected to the following syntax.

The branch information refers to condition determining algorithm determining which connection index will be processed in next turn. Also, there are provided the branch information corresponding to the number of the branches. The branch information can directly determine the sequence and contents of data to be read. As shown in table 2 below, if the number of branch is 1, no input data is provided and the pertinent operation directly advances to process the connection index designated by the branch information. However, if the number of branch is 2 or larger than 2, the condition determination is performed (consists of the following connection rule after the conditional text) and the pertinent operation advances to process corresponding connection index.

The syntax parsing unit 315 renews the CSCI storing unit 380 by processing the syntax defined in pertinent connection index. Then, the syntax parsing unit 315 reads the renewed data by referring to the element information of the CSCI storing unit 380 to use it for branch condition determination. This is because the branch condition of the branch information of an index R1 is 'C0==1' and the element information C0 after processing the syntax S0 for example.

TABLE 2

| Index | Syntax | Input | No. of Branches | Branch information(Written in SET-PROC grammar) |
|---|---|---|---|---|
| OK | — | — | — | None. |
| ERR | — | — | — | None. |
| R0 | — | — | 1 | 1: GO R1; |
| R1 | S0 | C0 | 2 | 1: (C0==1) GO R2;2: GO ERR; |
| R2 | S1 | — | 1 | 1: GO R3; |
| R3 | S3 | C1 | 2 | 1: (C1==1) GO R4;2: GO R6; |
| R4 | S4 | — | 1 | 1: GO R5; |
| R5 | S5 | — | 1 | 1: GO R6; |
| R6 | S6 | C0 | 2 | 1: (C0==1) GO R7;2: GO ERR; |
| ... | ... | ... | ... | ... |

TABLE 3

| Index | Element Name | Length/Type | Global/Local | Default value |
|---|---|---|---|---|
| C0 | Decoding OK | 1 bit | Local | |
| C1 | Branch condition | 8 bit | Local | |
| C2 | Profile and level indication | 8 bit | Global | |
| C3 | User data | 8 bit (Array) | Global | |
| C4 | Visual object verID | 4 bit | Global | 1 |
| C5 | Visual object priority | 3 bit | Global | 1 |
| C6 | Visual object type | 4 bit | Global | |
| C7 | Video format | 4 bit | Global | 5 |
| C8 | Video range | 1 bit | Global | |
| C9 | Color primaries | 8 bit | Global | 1 |
| C10 | (Unused) | | | |

TABLE 3-continued

| Index | Element Name | Length/Type | Global/ Local | Default value |
|---|---|---|---|---|
| C11 | Matrix coefficients | 8 bit | Global | 1 |
| C12 | Random accessible VOL | 1 bit | Global | |

As an example, the S-RT 420 can represent key minimum data of the table by using the similar script languish 'RT {(syntax id, branch_info), ( . . . )}'. The actual example is below.

```
S-RT {
(none, "1: GO R1") ,
("1: (C0==1) GO R2; 2: GO ERR;") ,
("1: GO R3;"),
...
}
```

As another example, the S-RT 420 can be represented in a binary code format through bit conversion as follows. In this case, an identifying code referring to S-RT is represented as '10' of a 2 bit indicator. An end part of the table is represented by an end of table (EOT), and each syntax index is represented in a 10 bit. It is assumed that variable length text data, bit-compiled with branch information, is arranged.

```
10
0000000010 10101...
0000000100 101110100101...
0000000101 0100101...
...
EOT
```

Even though the S-RT 420 can be represented in various formats as described above, each format represents the same meaning.

Finally, the CSCIT 430 describes details of the element information (e.g. the SET 410 and S-RT 420. In other words, the CSCIT 430 has all meaningful data (i.e. element information) that is processed from the bit stream, stored in the CSCI storing unit 380 and used by the macro-block based processing group 330.

The CSCIT 430 includes an index C as an identifier which is the inherent number of pertinent element information, the name of pertinent element information, an attitude for designating the data structural properly of the pertinent element information (e.g. the storing space size of the pertinent element information and whether the pertinent element information is of array type), Global/Local representing whether the pertinent element information is used in the syntax parsing process only or in the overall decoding process and a default value storing an initial value to be designated when no command is received for the element information corresponding to a particular syntax or a command for initialization is received. The default value can be employed to complement the blank of data when the syntax requested in accordance with bit stream circumstance is skipped.

As an example, the CSCIT 430 can represent key minimum data of the table by using the similar script languish 'CSCIT {(type, default=0), ( . . . )}'. The actual example is below.

```
CSCIT {
(integer),
(integer),
(integer),
(array),
(integer, 1),
...
}
```

As another example, the CSCIT 430 can be represented in a binary code format through bit conversion as follows. In this case, an identifying code referring to CSCIT is represented as '01' of a 2 bit indicator. An end part of the table is represented by an end of table (EOT), and the type is represented by 1 bit (e.g. integer=0, Array=1). It is assumed that in the case of having the default value (default flag is 1), the default value is represented by 8 bits.

```
01
0 0
1 0
0 1 00000010
0 1 00000000
1 0
...
EOT
```

Even though the CSCIT 430 can be represented in various formats as described above, each format represents the same meaning.

As described above, the syntax parsing unit 315 determines syntax to be processed by using S-RT 420, processes the pertinent syntax by SET 410, and generates element information (e.g. CSCI) to store it in the CSCI storing unit 380. In this case, the element information is stored corresponding to CSCIT 430. Then, if there is a branch condition that the pertinent element information is provided as input data, the syntax parsing unit 315 determines a connection index to advance through the substitution of the branch condition. However, if there is no branch condition, the following connection index advances. The syntax parsing unit 315 can store desired element information in the CSCI storing unit 380 by repeating the aforementioned process with reference to S-RT 420.

Briefly describing, for example, if the syntax parsing unit 315 attempts to process the connection index R2 of the S-RT 420, the syntax parsing unit 315 recognizes that the syntax index to be processed is S1 and a processing operation to be processed with reference to the syntax index S1 of the SET 410 is 'READ 8>C2;.' In other words, the syntax parsing unit 315 reads the 8 bit of suitable position in the bit stream and stores it in the CSCI storing unit 380 with the index of the element information C2. The element information C2 is recognized as 'profile and level indication' by the CSCIT 430. Also, the element information C2 will be stored in the CSCIT 420 after meeting a designated format. Then, the syntax parsing unit 315 advances to process a connection index R3 because the number of branch is 1.

Similarly, if the syntax parsing unit 315 attempts to process the connection index R3 of the S-RT 420, the syntax parsing unit 315 recognizes that the syntax index to be processed is R3 and a processing operation to be processed with reference to the syntax index S3 of the SET 410 is 'SEEK 32 B; (C1=($IBS==HEX1B2));.' In other words, the syntax parsing unit 315 reads the 32 bits of suitable position in the bit stream by a byte-alignment. Then, if the read $IBS is identical to 1B2(HEX==1B2) by 16 bit, the syntax parsing unit 315 stores 1 in the CSCI storing unit 380 with the index of the element information C1. If the read $IBS is not identical to 1B2 (HEX==1B2) by 16 bit, the syntax parsing unit 315 stores zero in the CSCI storing unit 380 with the index of the element information C1. The element information C1 is recognized as 'Branch Condition' by the CSCIT 430. Also, the element information C1 will be stored in the CSCIT 420 after meeting a designated format. Then, the syntax parsing unit 315 determines what connecting index is used, by the element information C1 stored to determine a condition text designated in the branch information. In other words, when the condition information suggested in the S-RT 420 is '1:(C1==1) GO R4; 2: GO R6,' if the read element information C1 is 1, a connection index R4 is used. However, otherwise, a connection index R6 is used.

A command used for the decoding description information employed for the present description can have READ, SEEK, CLEAR and DEFAULT. For example, the READ and the SEEK can be used for reading and interpreting. However, the READ can read next data after reading current data, while the SEEK does not move to read the next data after reading current data. Also, the CLEAR and the DEFAULT are used when data is initialized. However, the CLEAR deletes all array elements of element information, while the DEFAULT initializes the element information of a positive number to a predetermined default (in the case of no default, zero).

Accordingly, by the aforementioned table 1, 2, and 3, the syntax parsing flow performed by the syntax parsing unit 315 is the same as the following Table 4.

TABLE 4

| Control flow | Branch Control | SET | CSCIT | Description |
| --- | --- | --- | --- | --- |
| 0 | R0 | | | Visual object sequence start code |
| 1 | R1 | S0 | C0 | Profile and level indication |
| 2 | R2 | S1 | — | Visual object sequence end code |
| 3 | R3 | S3 | C1 | Is user data or not |
| 4 | R4 | S4 | — | User data start code |
| 5 | R5 | S5 | | User data |
| 6 | R6 | S6 | — | Visual object start code |
| 7 | R7 | S7 | C1 | Is visual object identifier |
| 8 | R8 | S8 | — | Visual object verID |
| 9 | R9 | S9 | | Visual object priority |
| ... | | | | |

As described above each table can be represented in a binary code format, analyzed and used. Accordingly, in case that an encoder transmits corresponding tables in the binary code format to a decoder, the transmitted data amount can be minimized.

An example of transmitting the tables in the binary code format is the same as the following table 5.

TABLE 5

| Binary code | Description |
| --- | --- |
| 00 | SET index |
| 010100101010... | Variable Length Process |
| ... | ... |
| 0xFFFFFF11 | 32-bit (or less) EOT |
| 01 | CSCIT index |

TABLE 5-continued

| Binary code | Description |
| --- | --- |
| 1 | Type |
| 0 | Default flag |
| 0 | Type |
| 1 | Default flag |
| 00000001 | Default value |
| ... | ... |
| 0xFFFFFF11 | 32-bit (or less) EOT |
| 10 | S-RT index |
| 0000000010 | 10-bit Syntax ID |
| 01010101000100... | Variable Length Branch Info. |
| ... | ... |
| 0xFFFFFF11 | 32-bit (or less) EOT |

Again, referring to FIG. 3, the decoding controlling unit 325 includes the CSCI storing unit 380 and the connecting controlling unit 385.

The CSCI storing unit 380 stores element information (e.g. CSCI) as the result syntax parsed by using the SET 410 and the S-RT 420 to correspond to the CSCIT 430. For example, the CSCI storing unit 380 can be a buffer memory.

The element information stored in the CSCI storing unit 380 can be used as input data for performing the process of the SET 410 by the syntax parsing unit 315 and a control variable for determining the following connection index in the S-RT 420.

Also, the element information stored in the CSCI storing unit 380 can be used as a control variable for determining the following connection index in the F-RT 540 by the connection controlling unit 385 or can be used for mapping the input CSCT of a particular functional unit to element information, stored in the CSCI storing unit 380, in the FU-CSCIT 460.

In other words, the element information stored in the CSCI storing unit 380 functions to link the syntax parsing unit 315 to the macro-block based processing group 330.

The connection controlling unit 385 sets the connection relationship of each functional unit in the macro-block based processing group 330 to decode the bit stream encoded by various standards. In other words, the connection controlling unit 385 selects a suitable one of each functional unit in the macro-block based processing group 330 and determines the performing sequence between the selected functional units. For this, the connection controlling unit 385 connects the pertinent functional units by using FL 440, F-RT 450 and CSCIT 430 and decodes video data in units of macro block by using element information provided from each of the functional units by the syntax parsing unit 315.

The connection controlling unit 385 uses CSCIT 430, FL 440, F-RT 450 and FU-CSCIT 460 to perform the aforementioned function.

First, the FL 440, as shown in table 6 below, is a table having the list of each functional unit in the macro-block based processing group 330. The FL 440 has index F as an identifier for identifying each functional unit, names of each functional units FU Name, the number of input control (CSCI) variable and input data and output data.

A particular functional unit selected by the connection controlling unit 385 receives the input data from the connection controlling unit 385 and performs a predetermined process to generate output data. Here, the functional unit is included in the connection controlling unit 385 and performs a series of processing operations (e.g. functional operation, algorithm or function), that is, performs the predetermined process of the input data and generates the output data. The functional units shown in table 6 will be described below together with the connection controlling unit 385.

TABLE 6

| Index No. | FU name | # of input CS/CI | Input data | Output data |
|---|---|---|---|---|
| F1 | DCR | 4 | QFS | QFSP |
| F2 | IS | 2 | QFSP | PQF |
| F3 | IAP | 3 | PQF | QF |
| F4 | IQ | 1 | QF | F |
| F5 | IT | 0 | F | f |
| F6 | FFR | 0 | f | D |
| F7 | SPR | 3 | f | r |
| ... | ... | ... | ... | ... |

Since QFS, QFSP, PQF and QF in table 6 is well-known to those of ordinary skill in the art (e.g. MPEG field), the permanent description will be omitted. As an example, OFS refers to an output value of variable length encoding.

The FL 440 can represent key minimum data of the table by using the similar script languish. The FL 440 can be also represented in a binary code format through bit conversion.

Then, F-RT 450 provides the connection rule of functional units used to decode inputted conventional bit stream 470.

As shown in table 7 below, the F-RT 450 includes index R identifying each connection rule, a functional unit F corresponding to a pertinent connection index, element information C requested for connection control, the number of branches capable of connected with a following functional unit and each branch information (#1, #2, #3 ...) requested corresponding to the number of branches. There is desired element information only in case that the number of branches is 2 or more. In this case, the connection index can be varied depending on the result of determining a condition text by using desired element information. In other words, if the number of branches is 1, there is no desired element information and the pertinent operation advances with the connection index indicated in the branch information. After a corresponding condition text, a following connection index is suggested.

TABLE 7

| Index No. | FU | Input | # of branches | Branch information |
|---|---|---|---|---|
| END | | | — | |
| R0 | — | — | 1 | 1: GO R1; |
| R1 | F1 | — | 1 | 1: GO R2; |
| R2 | F2 | C64 | 2 | 1: (C64==1)GO R3;2: (C64==0)GO R4; |
| R3 | F3 | — | 1 | 1: GO R4; |
| R4 | F4 | — | 1 | 1: GO R5; |
| R5 | F5 | C32 | 2 | 1: (C32==1)GO R6;2: (C32==0) GO R7; |
| R6 | F6 | — | 1 | 1: GO END; |
| R7 | F7 | — | 1 | 1: GO R6; |

The F-RT 450 can represent key minimum data of the table by using the similar script languish. The F-RT 450 can be also represented in a binary code format through bit conversion.

Finally, the FU-CSCIT 460 is a table for connecting element information stored in the CSCI storing unit 380 with element information (input CSCI) requested for each functional unit.

As shown in table 8, the FU-CSCIT 460 includes index F-C arranged as a pair of the element information and the index of FL 440, the pertinent element information, index C used for mapping in the CSCIT 430 and the data type of the element information.

For example, if four items of element information is inputted into F1 in the FU-CSCIT 460, the FU-CSCIT 460 lists the element information per functional unit. In other words, F1-C1, F1-C2, F1-C3 and F1-C4 are listed, and each of the element information is mapped by using the index C of the CSCIT 430 like C32, C34, C2 and C5. Similarly, if 2 items of element information is inputted to F2, F2-C1 and F2-C2 are listed, and each of the element information is mapped by using C39 and C8.

TABLE 8

| Index No. | CSCI information | CSCI | Data type |
|---|---|---|---|
| F1-C1 | Quantiser_step | C56 | 9-bit integer |
| F1-C2 | CBP | C58 | 2-bit integer |
| F1-C3 | Ac_pred_flag | C64 | 1-bit flag |
| F1-C4 | #MB | | 14-bit integer |
| F2-C1 | CBP | C58 | 2-bit integer |
| F2-C2 | Ac_pred_flag | C64 | 1-bit flag |
| F3-C1 | Quantiser_scale | | 9-bit integer |
| F3-C2 | Ac_pred_flag | C64 | 1-bit flag |
| F3-C3 | #MB | | 14-bit integer |
| F4-C1 | Quantiser_scale | | 9-bit integer |
| ... | ... | ... | ... |

The FU-CSCIT 460 can represent key minimum data of the table by using the similar script languish. The FU-CSCIT 460 can be also represented in a binary code format through bit conversion.

As described above, the connection controlling unit 385 first sets the connection relationship of each functional unit with reference to the F-RT 450. In other words, the connection controlling unit 385 specifies the functional unit corresponding to the current connection index and checks how many items of element information as input data is needed, in the FL 440. Then, the connection controlling unit 385 determines what element information requested by the pertinent functional unit, by the FU-CSCIT 460. Then, the connection controlling unit 385 extracts the corresponding element information from the CSCI storing unit 380 with reference to the index of CSCIT 430 written in the FU-CSCIT 460 and provides it to the pertinent functional unit. After that, the pertinent operation advances with a following connection index and repeats the aforementioned process. However, in this case, if the number of branches is 2 or more, the branch route can be varied depending on the pertinent element information.

The series of processes of setting the connection relationship of each functional unit by mutually referring to each table is the same as or similar to the case of the syntax parsing unit 315. Accordingly, this will be omitted.

By the aforementioned table 3, 6, 7 and 8, the syntax parsing flow performed by the connection controlling unit 385 is the same as the following table 9 and table 10. In other words, the connection relationship of different functional units can be set. This is illustrated in FIG. 7.

TABLE 9

| Control flow | Branch Control | FL | CSCIT | Description |
|---|---|---|---|---|
| 0 | R0 | — | — | |
| 1 | R1 | F1 | — | DCR |

TABLE 9-continued

| Control flow | Branch Control | FL | CSCIT | Description |
|---|---|---|---|---|
| 2 | R2 | F2 | C64 | IS |
| 3 | R3 | F3 | — | IAP |
| 4 | R4 | F4 | — | IQ |
| 5 | R5 | F5 | C32 | IT |
| 6 | R6 | F6 | — | FFR |
| 7 | END | — | — | — |

TABLE 10

| Control flow | Brach Control | FL | CSCIT | Description |
|---|---|---|---|---|
| 0 | R0 | — | — | — |
| 1 | R1 | F1 | — | DCR |
| 2 | R2 | F2 | C64 | IS |
| 3 | R4 | F4 | — | IQ |
| 4 | R5 | F5 | C32 | IT |
| 5 | R7 | F7 | — | SPR |
| 6 | R6 | F6 | — | FFR |
| 7 | END | — | — | — |

Again, referring to FIG. 3, the macro-block based processing group 330 decodes video data in units of macro block, inputted from the syntax parsing unit 315, and outputs the decoded video data having a predetermined size. The macro-block based processing group 330 can include functional units for performing the aforementioned functions corresponding to each standard.

Accordingly, the macro-block based processing group 330 can be considered as a kind of tool box. Each functional unit can be realized by an independent processing block (e.g. software program, the combination of command codes and function) or the macro-block based processing group 330 can be realized as one processing block.

As illustrated in table 6, the macro-block based processing group 330 includes a de-blocking functional unit (DF FU) 610, a VOP reconstructor functional unit (VR FU) 615, a frame field reordering functional unit (FFR FU) 620, an intra prediction and picture reconstruction functional unit (IPR FU) 630, an inverse transform functional unit (IT FU) 635, an inverse quantization functional unit 645, an inverse AC prediction functional unit (LAP FU) 655, an inverse scan functional unit (IS FU) 660 and a DC reconstruction (DCR FU) 665. A IT 4×4 FU 640, an IQ 4×4 FU 650 and DCR 4×4 process the block having 4×4 size. This is because there is a case that MPEG-1/2/4 processes the block of 8×8 size in transform, quantization, and prediction, while MPEG-4 AVC processes the block of 4×4 size.

It shall be evident that the macro-block based processing group 330 can include all functional units for data decoding function regardless of the applied standard, a functional requested for a technology development process can be newly added, a previous functional unit can be amended and an unnecessary functional unit can be deleted. For example, in the case of additionally requesting an IS 4×4 FU processing data with 4×4 block size, the macro-block based processing group 330 can further include the pertinent functional such as the IS 4×4 FU. Also, the macro-block based processing group 330 can further include a special prediction functional unit (SPR FU) for performing the intra prediction at the MPEG-4 AVC.

It is also evident that each functional unit included in the macro-block based processing group 330 can be integrated as one functional unit in case that they are independently not provided at each standard and can be identically processed regardless of the standards. Since the functions of each of the functional units are well-known to those of ordinary skill in the art, they will be described in detail.

The DF FU 610 is the de-blocking filter of MPEG-4 AVC, and the VER FU 615 is a functional unit storing a decoded pixel.

The FER FU 620 is a functional unit for an interlaced mode, and the IPR FU 630 is a functional unit performing the intra prediction of MPEG-4 AVC and storing the decoded pixel. As described above, the intra prediction of MPEG-4 AVC can be performed by the SPR FU.

The IT FU 635 is a functional unit performing the inverse transform of DC and AC, and an IQ EU 645 is a functional unit performing the inverse quantization of AC.

The LAP FU 655 is a functional unit performing the inverse AC prediction of AC, and the IS FU 660 is a functional unit performing the inverse scan. The DCR FU 665 is a functional unit performing the inverse prediction and inverse quantization of DC.

It is not necessary that each operation of the aforementioned syntax parsing unit 315 and the macro-block based processing group 330 must be successively performed (i.e. the operation of the macro-block based processing group 330 must start after the operation of the syntax parsing unit is completed). It is evident that the two operations can be simultaneously performed. This is because if the minimum element information only, requested for the operation of the current operated functional unit, is stored in the CSCI storing unit by the syntax parsing unit 315, it will be sufficient.

To realize integrated codec, each element must be organically controlled such that a bit stream can be decoded with a decoding method corresponding to a pertinent encoding method by parsing the bit stream compressed by various encoding methods.

In this case, the pertinent bit stream can be a bit stream of various shapes mixed with various standards (codecs) or another bit stream of various shapes generated by various encoding methods in one standard. Also, to support various encoding/decoding methods, it is necessary that various functions can be separated into independent units and desired units can be selected among the independent units to make them one codec (encoder and decoder).

Also, described above, the present invention can organically connect and control each element by use of the same information analyzing method regardless of an encoding method encoded with a bit stream by providing together decoding description information.

Also, the present invention can deal with the change or new addition of the syntax of a bit stream by only amending pertinent information or inserting the additional information. The present invention also can set the connection relationship of the macro-block based processing group 330 of the pertinent decoder and functional units by allowing a user to select a desired function in processing units of bit stream-level, frame-level and macro block-level and forms the F-RT 450.

Figure 8:
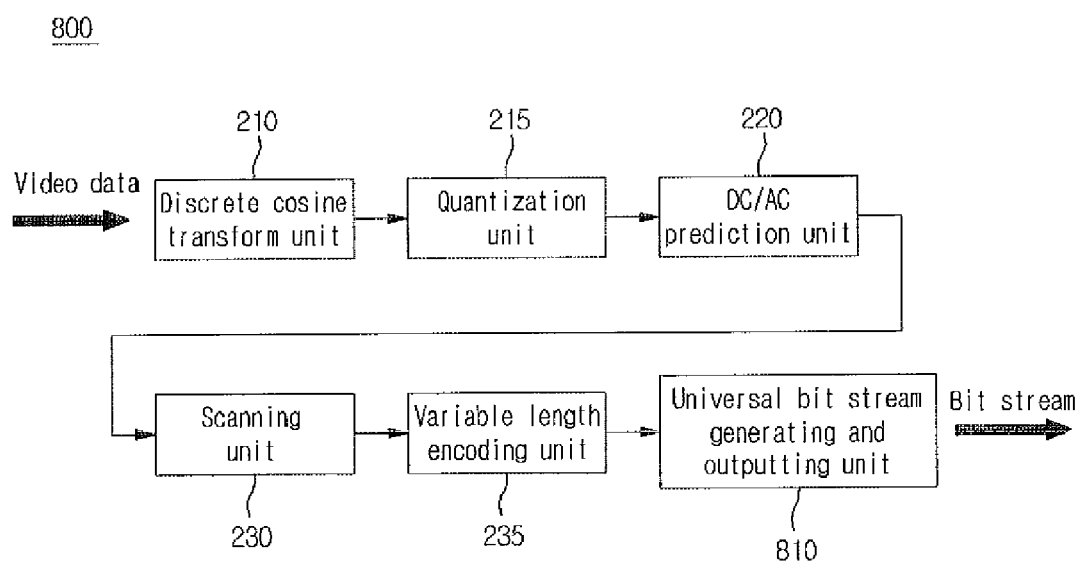
FIG. 8 is a block diagram illustrating the structure of an encoder in accordance with an embodiment of the present invention.

FIG. 8 is a block diagram illustrating the structure of an encoder in accordance with the embodiment of the present invention.

The encoder 800 of the present invention further includes a universal bit stream generating and outputting unit 810 as compared with the conventional encoder 200, which was described with reference with FIG. 2. The universal bit stream generating and outputting unit 810 generates decoding description information by using the control information (e.g. the list and connection relationship of used functional units and the input data, syntax information and syntax connection information of the pertinent functional unit) of the generating processing operation of the conventional bit stream 470, generated by the previous processes. Also, a universal bit stream is generated by using the generated decoding description and conventional bit stream 470 to be transmitted to the decoder 800. Since the method of generating the description information is apparent enough to those of ordinary skill in the art, the pertinent description will be omitted.

Also, the variable length encoding unit 230 merely refers to an element (e.g. encoding unit) finally performing an encoding to generate a bit stream in the encoder 800, but the present invention is not limited to the variable length encoding unit 230. Also this does not restrict the scope of claims of the present invention FIG. 8 assumes the case that the universal bit stream 400 generated by using the decoding description information and the conventional bit stream 470 is provided to the pertinent decoder.

However, as described above, the decoding description information can be provided to the decoder 800 by an additional data format or a bit stream format. In this case, it is evidently possible that the universal bit stream generating and outputting unit 810 is not provided behind the variable length encoding unit 235 and the universal bit stream generating and outputting unit 810 is independently provided from the conventional encoding unit 200 to provide independently-generated information to the decoder 800.

In the present description, the integrated codec apparatus and method in accordance with the present invention is mainly described based on the decoder. Considering that the relationship between the decoder and encoder is well-known to those of ordinary skill in the art and the encoder can easily be structured with the description related to the decoder only, it is evident that the present invention is not limited to the decoder.

As described above, the integrated codec apparatus and method of the present invention makes it easy to analyze a syntax element in a standard (or codec) or between different standards or to control the connection of pertinent functional units. In other words, in the present invention, there is no problem when changing the sequence of syntax elements in the bit stream generated according to a particular standard, inserting new elements and deleting a previous syntax element.

Also, in accordance with a prior art, there is a problem that the decoder is not able to properly decode a corresponding bit stream in the manipulation of the syntax element. For example, if a structure of ABC bit stream information is changed to a structure of ACB, the decoder may not recognize the structure of ACB and thus impossible to perform a proper decoding. Similarly, for a structure of ABFC by adding F or another structure of AC by deleting B, the decoder may not recognize the structure and thus impossible to perform the proper decoding.

However, in the integrated codec apparatus and method of the present invention, since the decoding description included in the universal bit stream or the decoding description as independent data is provided to the decoder 800, the decoder 800 can perform the proper decoding operation.

The syntax analyzing method for the decoding device and the bit stream decoding in accordance with the present invention has been described based on the MPEG-4 AVC. However, it is evident that the present invention can be identically applied to the MPEG-1, MPEG-2, MPEG-4 and other video data encoding/decoding standards without any restriction.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

INDUSTRIAL APPLICABILITY

As described above, the present invention can decode a bit steam encoded by various types (syntax and semantics) in accordance with each standard (e.g. MPEG-1, MPEG-2, MPEG-4, and MPEG-4 AVC) by using the same information recognizing method).

Also, the present invention can parse a bit stream compressed by various methods by using the same information analyzing method and organically control each functional unit for decoding by using the parsed data.

Also, the present invention can commonly apply a syntax analyzing method for decoding various types of bit streams.

Also, the present invention can easily decode a bit stream when a syntax element is changed or added.

Also, the present invention can share elements used for the bit stream decoding of the element information (i.e. a result from syntax parsing) of analyzed syntax.

In addition, the present invention can use the element information of analyzed syntax for analyzing the syntax element of a following bit stream.

The invention claimed is:

1. A decoding device, comprising:
a syntax parsing unit configured to syntax parse a bit stream using description information in order to generate a plurality of element information, and store the plurality of element information in an element information storing unit, the description information and the bit stream being provided by an encoder;
a connection controlling unit configured to
successively select a plurality of functional units,
determine a performing sequence between the selected plurality of functional units according to the description information, and
selectively input element information from the plurality of element information stored in the element information storing unit into the selected plurality of functional units; and
a processing unit comprising at least the plurality of functional units,
wherein the plurality of functional units are configured to perform a process according to the performance sequence and by using the element information inputted by the connection controlling unit, and output corresponding result data, and
wherein the description information comprises:
a syntax element table (SET) including process generating information related to a bit stream syntax and element information corresponding to the bit stream syntax;
a syntax rule table (S-RT) including a connection rule between the bit stream syntax;
a control signal and text information table (CSCIT) including details about the plurality of element information stored in the element information storing unit;
a functional unit list (FL) including a list of functional units including the plurality of functional units;
a functional unit-rule table (F-RT) including rules for successively selecting the plurality of functional units; and a function unit-CSCIT (FU-CSCIT) identifying the element information to be selectively input into the selected plurality of functional units.

2. The decoding device of claim 1, further comprising:
a universal bit stream analyzing unit configured to
separate a universal bit stream into the bit stream and the description information,
input the bit stream into the syntax parsing unit, and
store the description information in a description information storing unit if the bit stream and the description information are inputted as the universal bit stream.

3. The decoding device of claim 1, wherein the description information is inputted as independent data or a bit stream.

4. The decoding device of claim 1, wherein the process comprises inputting result data of a prior-activated functional unit of the selected plurality of functional units into subsequently-activated functional unit of the plurality of functional units.

5. The decoding device of claim 1, wherein the syntax parsing unit is configured to convert the bit stream to successive macro blocks of a predetermined size and input the successive macro blocks into the processing unit.

6. The decoding device of claim 1, wherein the description information comprises a binary code.

7. The decoding device of claim 1, wherein the syntax parsing unit is configured to
select the bit stream syntax by using the S-RT,
generate the plurality of element information by using the SET, and
store the generated plurality of element information in the element information storing unit to correspond to the CSCIT.

8. The decoding device of claim 1, wherein the connection controlling unit is configured to
select the plurality of functional units by using the F-RT,
recognize a property of the selected plurality of functional units by using the FL,
extract the element information to be selectively input from the element information storing unit by using FU-CSCIT and the CSCIT, and
input the extracted element information into the selected plurality of functional units.

9. An encoding device, comprising:
an encoding unit configured to convert inputted video data into a bit stream according to predetermined encoding method by successively using a plurality of functional units of the encoding device; and
a description information generating unit configured to generate description information in accordance with syntax information of the bit stream and a connection relationship,
wherein the bit stream and the description information are provided to a decoder,
wherein the connection relationship is a connection relationship of a plurality of functional units of the decoder,
wherein the description information includes information about a performing sequence between the plurality of functional units of the decoder, and
wherein the description information comprises:
a syntax element table (SET) including process generating information related to a bit stream syntax and element information corresponding to the bit stream syntax;
a syntax rule table (S-RT) including a connection rule between the bit stream syntax;
a control signal and text information table (CSCIT) including details about the element information;
a functional unit list (FL) including a list of functional units including the plurality of functional units of decoder;
a functional unit-rule table (F-RT) including rules for successively selecting the plurality of functional units of the decoder; and
a function unit-CSCIT (FU-CSCIT) identifying the element information to be inputted into the plurality of functional units of the decoder.

10. The encoding device of claim 9, wherein the bit stream and the description information are provided to the decoder as a universal bit stream.

11. The encoding device of claim 9, wherein the bit stream and the description information are separately provided to the decoder.

12. A decoding method, comprising:
receiving a bit stream and description information from an encoding device;
generating a plurality of element information by syntax parsing of the bit stream using the description information;
storing the generated plurality of element information in an element information storing unit;
converting the bit stream to successive macro blocks of a predetermined size and outputting the successive macro blocks;
selecting a plurality of functional units, determining a performing sequence between the selected plurality of functional units according to the description information, and selectively inputting element information from the plurality of element information stored in the element information storing unit into the selected plurality of functional units; and
performing a process by the selected plurality of functional units, the process performed according to the performance sequence and using the inputted element information, and outputting corresponding result data,
wherein the step of selecting the plurality of functional units, determining the performing sequence and selectively inputting element information, and the step of performing the process and outputting the corresponding result data are repeated until the result data is video data corresponding to the macro block, and
wherein the description information comprises:
a syntax element table (SET) including process generating information related to a bit stream syntax and element information corresponding to the bit stream syntax;
a syntax rule table (S-RT) including a connection rule between the bit stream syntax;
a control signal and text information table (CSCIT) including details about the plurality of element information stored in the element information storing unit;
a functional unit list (FL) including a list of functional units including the plurality of functional units;
a functional unit-rule table (F-RT) including rules for successively selecting the plurality of functional units; and
a function unit-CSCIT (FU-CSCIT) identifying the element information to be selectively input into the selected plurality of functional units.

13. The decoding method of claim 12, wherein the step of storing the plurality of element information in the element information storing unit comprises:
selecting the bit stream syntax by using the S-RT;

generating the plurality of element information by using the SET; and storing the generated plurality of element information in the element information storing unit to correspond to the CSCIT, wherein the above steps are repeated until element information corresponding to a plurality of bit stream syntaxes is generated and stored.

14. The decoding method of claim 12, wherein the step of selecting the plurality of functional units, determining the performing sequence and selectively inputting the element information comprises:

selecting the plurality of functional units by using the F-RT;

recognizing a property of the selected plurality of functional units by using the FL extracting the element information to be selectively input from the element information storing unit by using FU-CSCIT and the CSCIT; and inputting the extracted element information into the selected plurality of functional units.

15. The decoding method of claim 12, wherein the step of receiving the bit stream and the description information comprises:

receiving the bit stream and the description information in a universal bit stream;

separating the universal bit stream into the bit stream and the description information;

inputting the bit stream into a syntax parsing unit of the decoder; and storing the description information in a description information storing unit of the decoder.

16. The decoding method of claim 12, wherein the step of receiving the bit stream and the description information comprises one of:

receiving the bit stream and the description information in a universal bit stream; and receiving the description information separately from the bit stream.

17. The decoding method of claim 12, wherein the process comprises inputting result data of a prior-activated functional unit of the selected plurality of functional units into subsequently-activated functional unit of the plurality of functional units.

18. The decoding method of claim 12, wherein the description information comprises a binary code.

19. The decoding method of claim 12, wherein the step of converting the bit stream to successive macro blocks of a predetermined size and outputting the successive macro blocks comprises storing the successive macro blocks in the element information storing unit and wherein the process includes sequentially inputting the stored successive macro blocks into the selected plurality of functional units.

* * * * *